A. V. JENSEN.
APPARATUS FOR MAKING CEMENT PIPES.
APPLICATION FILED APR. 23, 1912.
1,134,202.
Patented Apr. 6, 1915.
4 SHEETS—SHEET 1.
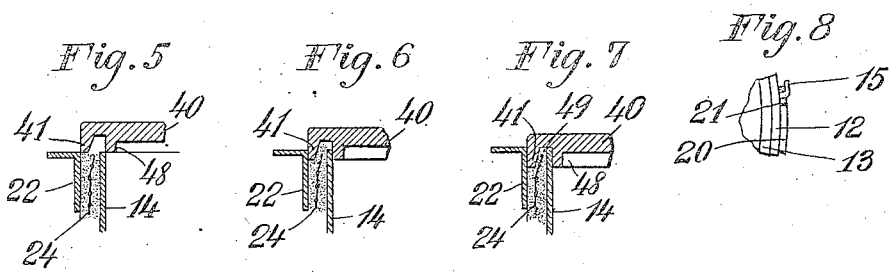
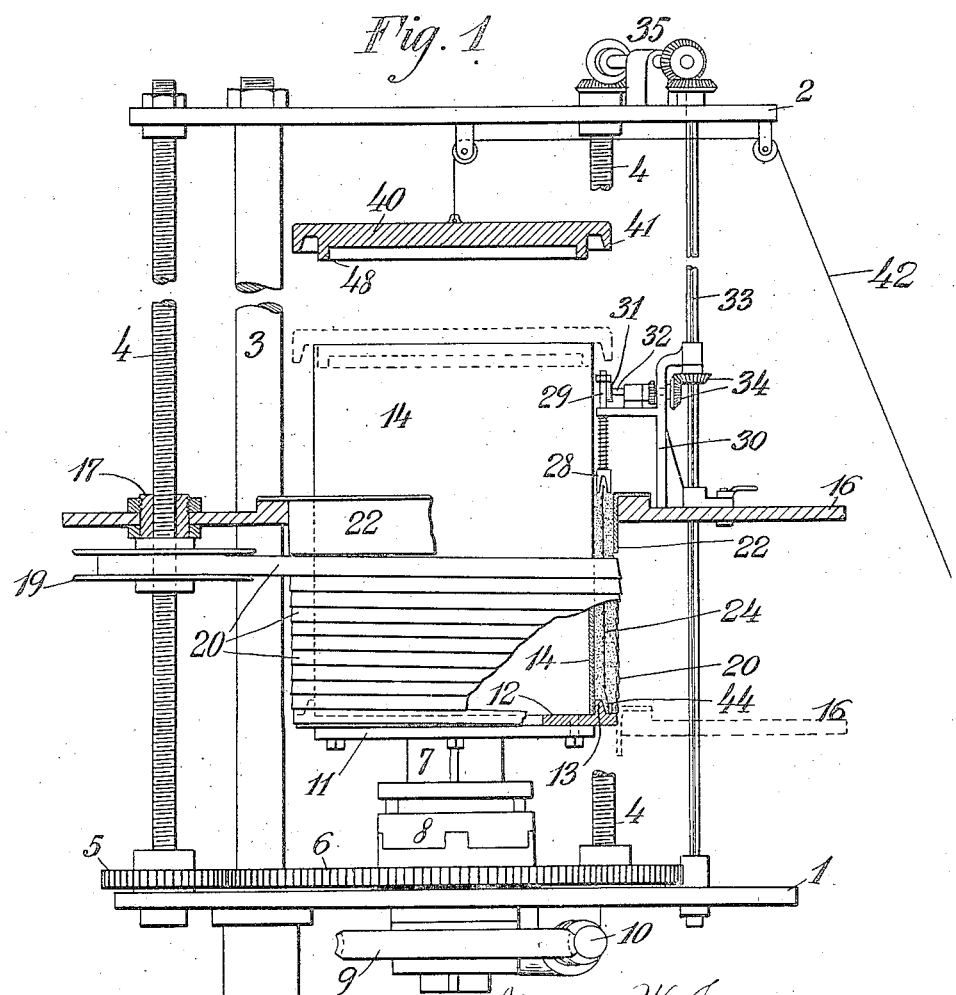

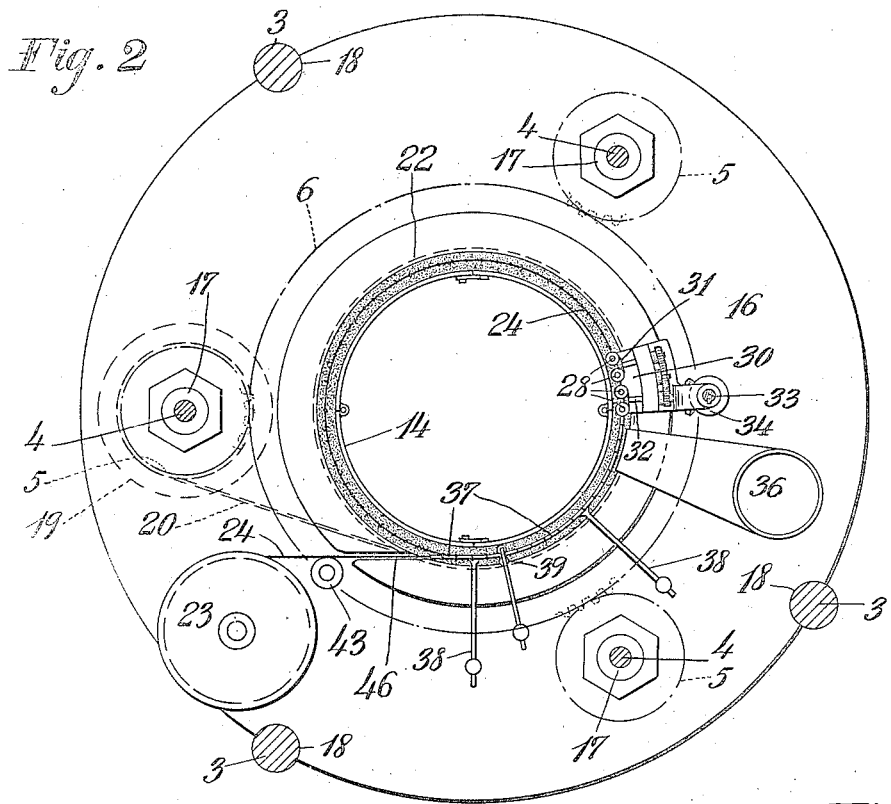
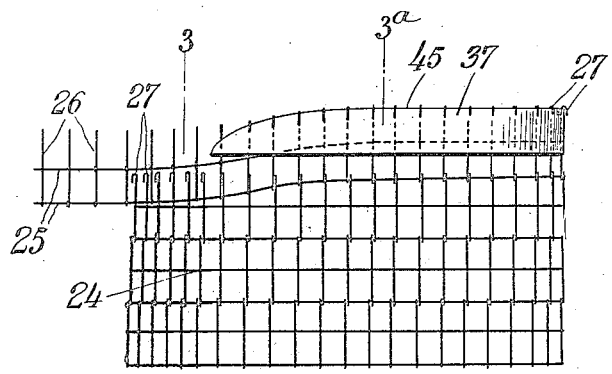
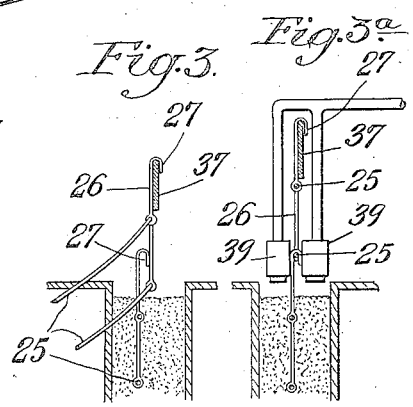

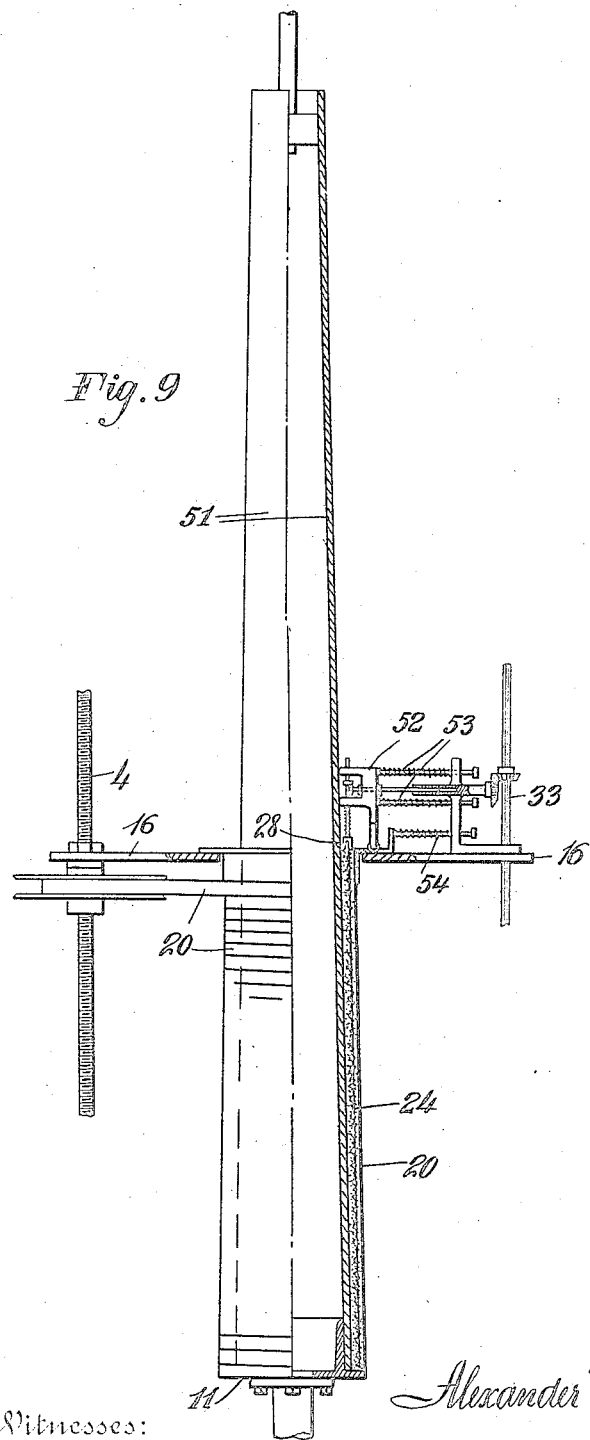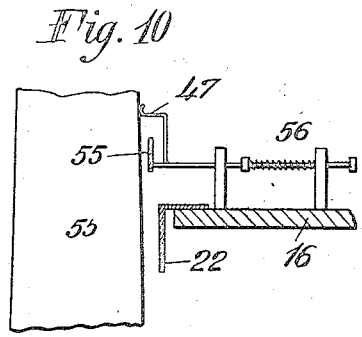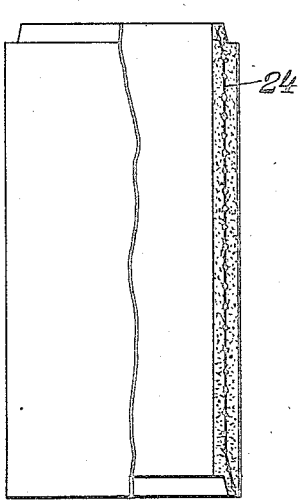

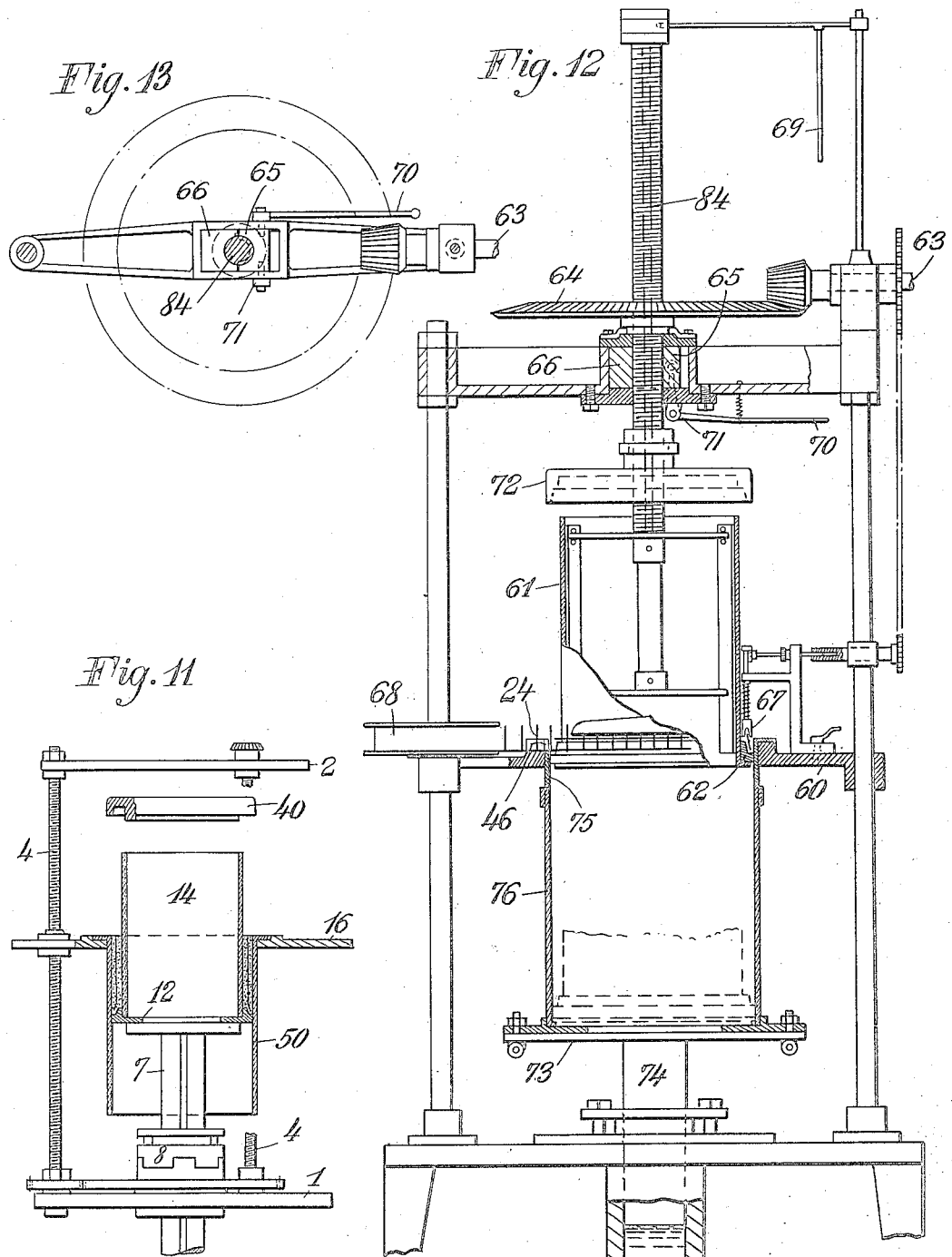

UNITED STATES PATENT OFFICE.

ALEXANDER V. JENSEN, OF BROOKLYN, NEW YORK.

APPARATUS FOR MAKING CEMENT PIPES.

1,134,202.  Specification of Letters Patent.  Patented Apr. 6, 1915.

Application filed April 23, 1912. Serial No. 692,732.

*To all whom it may concern:*

Be it known that I, ALEXANDER V. JENSEN, a citizen of the Danish Monarchy, and a resident of Brooklyn, Kings county, New York, have invented certain new and useful Improvements in Apparatus for Making Cement Pipes, of which the following is a specification.

This invention relates to improvements in apparatus for making cement pipes.

One object of the invention is to provide an improved apparatus of making cement pipes or hollow cementitious articles in general and to provide the same with reinforcement in a novel manner.

Another object is to provide a machine or machines of simple and novel design and construction for making cement pipes with reinforcement.

Still another object of the invention is to provide a novel form of reinforcing material for hollow cementitious articles.

Other objects ancillary to the aforesaid objects of the invention will appear as this specification proceeds.

In the drawings and in the following description I refer more particularly to cement pipes, but this is to be taken to include all sorts of hollow articles adapted to be produced and by my improved machine, such for instance as telegraph and telephone poles, fence posts, columns and the like, and the appended claims should be read and construed as covering all such articles, whether specifically referred to by name or not.

To this end the invention comprises such parts and elements, and combinations thereof, as are embodied in the following description and illustrated in the accompanying drawings which show, by way of illustration only, one form of carrying out my invention.

In the said drawings Figure 1 is an elevation partly in section for making hollow cylindrical reinforced cement pipes and like articles according to my invention. Fig. 2 is a plan view of the machine shown in Fig. 1. Figs. 3 and 3ª are detail views of the means for feeding the reinforcing material to the machine taken on lines 3 and 3ª in Fig. 4. Fig. 4 is a partial view of the tubular reinforcement which I prefer to employ. Figs. 5, 6 and 7 are detail views showing certain steps in the making of the cement pipe. Fig. 8 is a detail view showing the manner of attaching the outer wrapping member to the female end form. Fig. 9 shows a machine for making conical shaped hollow cement articles such as telegraph poles for instance. Fig. 10 shows a detail view of parts of the machine shown in Fig. 9. Fig. 11 shows a modification of the machine illustrated in Fig. 1. Fig. 12 shows still another modification of the machine shown in Fig. 1. Fig. 13 is a partial plan view of Fig. 12, and Fig. 14 is a view partly in section of a cement pipe made according to my invention.

Referring to Figs. 1 to 8 the numeral 1 represents a suitable base or bedplate and 2 is an upper frame, both of which are joined by and supported on columns 3, 3, 3. Journaled in said bed plate and upper frame are three vertical screw shafts 4, 4, 4 each of which carries at its lower end a gear 5 driven by a large gear 6 on a shaft 7. The gear 6 is not fast on the shaft 7 but is coupled thereto by a suitable clutch mechanism as at 8 which may be operated by a treadle or in any other approved manner. The shaft 7 carries a worm wheel 9 driven by a worm on the main driving shaft 10. Any other well known driving mechanism may be used to drive the shaft 7.

On the shaft 7 there is fixed a turntable 11 which supports a female end form 12 having an inner flange 13. Inside the latter and resting on said female end form is a hollow pipe core formed by a collapsible pipe 14. Any form of collapsible cylinder may be used for this purpose. The member 12 carries a hook 15, Fig. 8.

16 is a platform provided with three nuts 17, 17, 17 in threaded engagement with the aforesaid shafts 4, whereby, when the latter are rotated, the platform is caused to travel vertically. During this travel the platform may be guided on the supports or columns 4 as shown at 18 in Fig. 2.

One of the nuts 17 carries a drum 19 upon which is wound a flexible wrapping member 20 such as a leather or metal band or strap made of other suitable material provided with a catch 21 adapted to engage the aforesaid hook 15, see Fig. 8.

The platform 16 supports a guide member 22 for guiding or confining the cement or other material around the core 14.

23 is a drum pivoted on the platform 16 and upon which is wound the reinforcing material 24. The member 22 together with the inner core forms a mold into which the cement is fed together with the reinforcing material.

I propose to employ a flexible reinforcing material adapted to form a tubular structure having reinforcing members both ways, longitudinally and circumferentially of the pipe or cylinder, and further adapted to be self interlocking or one, in which the various turns of the material around the pipe and within the cement are adapted to engage and interlock, one with the other. There are no doubt several forms in which I may embody my invention with respect to the reinforcing material *per se*, but I prefer using that illustrated in Figs. 3, 4 and 14. It will be seen that I form the reinforcement 24 of two parallel strands or lengths of pliable wire 25, 25, which at short intervals are joined by vertical members 26 which project upwardly or to the one side of said strands 25 and the ends of which are bent to form hooks 27. The tubular reinforcing structure is formed by a plurality of turns of the material 24 and whereby the hooks 27 are caused to engage the lowermost strand or length 25 of the succeeding turn. The hooks are shown as being uppermost but they may of course be reversed and thus engage the uppermost strand or length 25. It is not important that the reinforcement be composed of but two strands running lengthwise and short interlocking members positioned transversely to them. More than two lengthwise members may be used and other members, at an acute angle to the strands 25 may be employed if desired all of those forms being within the contemplated scope of my invention.

After the tubular reinforcement is embedded in the cement the strands 25 resist or take care of circumferential stresses or strains, while the members 26 form practically longitudinal reinforcing members running the length of the pipe or similar article and resist bending or other strains or stresses.

As is usual in machines of this character stamping means are provided for stamping the cement closely around the inner core. In this instance I provide a battery of stamps 28 adapted to stamp the material closely on both sides of the reinforcement as shown in Fig. 1.

The stamps 28 are carried by vertically reciprocating rods 29 supported and guided in a bracket 30. The stamps are operated by cams 31 on inter-driven shafts 32. Motion is imparted to the latter from a shaft 33 by gears 34. The shaft 33 is driven from one of the shafts 4 by a transmission mechanism 35 as will be easily understood.

36 is a spout through which the cement in plastic form is fed into the space around the inner core. For certain classes of work I may employ a so-called cement gun for forcing the material onto the reinforcement and dispense with the stamps, or I may use both. The stamp bracket 30 is pivoted on the shaft 33 so as to be moved into or out from working position as will be explained later.

37 is a guide rail for leading the reinforcement in around the inner core 14. It is carried by suitable supports 38. 39, 39 are guide and hook closing rolls for interlocking the hooks 27.

40 is a form for forming or molding the male end of the pipe and is provided with a depending flange 41 for this purpose. It may be raised or lowered by a cable 42.

The operation is as follows: The starting position of the platform 16 is low opposite the turntable 11 as shown dotted in Fig. 1. The reinforcement 24 is unwound from the spool 23, led past a guide roll 43 over the rail 37 and secured to a vertical pin 44 in the form 12, see Fig. 1. The clutch 8 is out and the shaft 7 is caused to rotate and at the same time the feed of the cement is started. As the core 14 is being rotated, cement is stamped firmly on the female form member 12 into the space between the core and the guide 22 and on both sides of the reinforcement which latter will be bent slightly inward. When both the strands 25 of the reinforcement have been covered by the cement the clutch 8 is thrown in to couple gear 6 to the shaft 7 whereby the shafts 4 are caused to rotate by the gears 5. Consequently the platform 6 begins to rise. When the cement has reached a height equal to the height of the guide 22, the wrapper 20 is unwound and its free end secured as in Fig. 8 and as the platform keeps on rising, the wrapper 20 is wrapped firmly around the cement pipe as shown in Fig. 1 and the material with the reinforcement embedded therein is firmly confined between the inner core and the wrapper. The reinforcing material is interlocked as follows. During the operation the reinforcement passes over the rail 37 as shown in the detail views in Fig. 3. Immediately after it has passed onto the rail it is also raised by riding up over the high portion 45 of rail. This is for the purpose of causing the lowermost strand 25 to engage the hooks 27 of the preceding turn of the reinforcement. Also, by being lifted up a slight pull is exerted on the vertical members 26 to prevent the latter from bending. Immediately after the reinforcing mesh has been thus interengaged the hooks are closed over the upper strand 25 by passing between the closing rolls 39 as will be understood. To sum up, the lower circumferential strand of the reinforcing mesh engages the hooks of the preceding turn by being let in at a lower level than said hooks, thereafter being raised into the hooks and finally the mesh is interlocked by the hooks being closed automatically over the circumferential member.

In Fig. 2 at 46 I show a cut out in the guide member 22 to permit of the reinforcing mesh being fed in at a lower level than the hooks 27. This is also illustrated in Fig. 12 as will be pointed out later. Thus it will be seen that the feed of the reinforcing mesh and the wrapping or outer form member 20 is operated by the turntable 11 which also feeds the cement past the stamps.

When the platform 16 has reached a height at which the guide member 22 is opposite the top of the inner core as seen in Fig. 5, the gear 6 is uncoupled from the shaft 7 to stop the rotation of the screw-shafts and the further rising of the platform. The wrapper 24 is cut off and the end pinned or otherwise secured, the stamps are swung out of the way and the feed chute withdrawn. The reinforcement is cut off and the end bent down. It will be remembered, however, that the turntable is still rotating. The male form member 40 is now lowered until its outer flange 41 which I will term a male end forming flange in contradistinction to the female end forming flange 13, rests on the cement. The member 40 may have an inner guide flange 48 to fit inside the core 14. It is obvious then, that the member 40 partakes of the rotating movement of the core and the cement, and it gradually by its own weight forms the male end of the pipe as illustrated in Figs. 6 and 7 forcing the reinforcement inwardly, out into the male end 49 of the pipe. Next the platform may be operated upward to clear the finished pipe. The female member 12 is detached from the turntable and the pipe inside the wrapper set aside to dry and harden. After this the core is collapsed and taken off and the wrapping unwound to be used again and the pipe is finished for use, or the wrapping may remain on the pipe to protect it during shipment.

In Fig. 11 I have shown a modified construction in which instead of the wrapper I use an outer cylinder 50 which is carried by the platform 16. The operation is similar to the above described, and it is a matter of choice whether or not the cylinder 50 remains on the cement pipe until the latter is hardened. If so, the cylinder will preferably be made in two halves to be open as will be easily understood.

Fig. 9 shows a machine for making conical pipes for use as telegraph poles and the like. In this instance the inner collapsible core 51 is cone-shaped. The stamps are kept their proper distance from the cone-shaped core by a movable bracket 52 which touches said core, being forced against the same by springs 53. The guide member is made collapsible in any suitable manner and is kept in position by springs as at 54. Similarly the guide rail 55 is pushed toward the core by springs as at 56 in Fig. 10, and guided by a guide 47. Fig. 14 shows the finished reinforced pipe.

The machine illustrated in Figs. 12 and 13 is of substantially the same design as those above described, but in this instance the platform 60 is stationary while the inner core 61 and the female end forming member 62 are fed downward in addition to being rotated. These elements are shown in their starting position in full lines and dotted in their finishing position. 63 is the driving shaft which drives a gear 64 on the screw shaft 84. The latter is threaded into the one half 65 of a nut 66 and carries the core down as it is rotated. In this instance the stamps 67 and mesh spool 68 remain at a constant level as will be understood. When the pipe has been formed the screw shaft 64 is kept rotating but the nut half 65 is thrown out of engagement with the shaft by a member 69 which strikes the arm 70 of a bell crank 71. Thereafter the male end forming member 72 is let down and operates as before to form the male end of the pipe.

The turntable 73 is carried by a plunger 74 under hydraulic pressure, for instance, and is lowered when the pipe is finished to clear the latter from the grinding member 75 which is provided with a cut out 46 as aforesaid. The outer form member 76 is then detached from the turntable, the pipe removed and the machine is ready for another operation.

The foregoing is thought to clearly set forth the construction and operation of my pipe making machine and the construction of the finished product.

Changes in the detailed construction may of course be made within the principle of the invention and the scope of the appended claims.

I claim:

1. An apparatus for making reinforced cement pipe comprising a core, means for depositing a plastic material onto said core to form the pipe, means for supplying the latter with reinforcement, a flexible member and means for winding the latter around the pipe to support the same.

2. An apparatus for making reinforced cement pipe comprising a collapsible core, means for depositing a plastic material onto said core to form the pipe, an outer shell for supporting the pipe while it is being made, means for embedding reinforcing members in the wall of the pipe as it is being made, means for rotating said core, a flexible member, and means for wrapping the latter around the pipe to support the same while it is being made.

3. An apparatus for making reinforced cement pipe comprising an inner core, a shell surrounding said core and spaced therefrom to form a circular mold, means for supplying material to the latter, stamping means for compressing the material in said mold, a flexible member and means for wrapping the latter around the pipe to support the same after being formed in said mold.

4. An apparatus for making cement pipe comprising a core, a platform, a circular shell supported on the latter and surrounding said core, but spaced therefrom to form an annular mold around the same, means supported on said platform for feeding material to said mold, means for operating said platform to cause the said formed mold and the said feeding means to be shifted lengthwise of the said core as the pipe is being formed around the latter, a flexible member and means for wrapping the same around the formed pipe below the said circular shell.

5. An apparatus for making cement pipe comprising a core, a circular member surrounding the same but spaced a distance therefrom whereby an annular space is formed between said core and said circular member, means for supplying material to the said space to form the pipe therein, means for moving the said circular member upwardly the length of the core as the pipe is being formed and flexible means adapted to be wound around the core to support the material thereon after the pipe has been formed within the said space.

6. An apparatus for making cement pipe comprising a core forming a mold member of a length equal to the length of the finished pipe, an outer mold member spaced from said core of a length less than that of the finished pipe, means for moving said outer mold member upwardly the length of the core as the pipe is being formed, means for supplying material to the mold formed between the said two mold members, a flexible member and means for wrapping the same progressively around the formed pipe.

7. An apparatus for making cement pipe comprising an inner and an outer mold member forming a mold, means for feeding material into said mold, pivoted stamping means for compressing the material in the mold, means for supplying a reinforcing element and for winding the same in the wall of the pipe as it is being formed, flexible wrapping means, means for winding the latter around the pipe after the latter has been formed in the mold and mechanism for causing said outer mold members and all of the aforesaid means to travel simultaneously lengthwise of the said inner mold member.

Signed at New York, N. Y., this 19th day of April, 1912.

ALEXANDER V. JENSEN.

Witnesses:
 IVAN KONIGSBERG,
 K. G. LEARD.